(12) United States Patent
Tsai et al.

(10) Patent No.: US 7,146,162 B2
(45) Date of Patent: Dec. 5, 2006

(54) METHOD AND SYSTEM FOR MANAGING RESOURCES IN WIRELESS COMMUNICATION SYSTEMS

(75) Inventors: Yingming Tsai, Boonton, NJ (US); Guodong Zhang, Patchogue, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 195 days.

(21) Appl. No.: 10/807,969

(22) Filed: Mar. 24, 2004

(65) Prior Publication Data
US 2004/0192360 A1 Sep. 30, 2004

Related U.S. Application Data

(60) Provisional application No. 60/457,821, filed on Mar. 25, 2003.

(51) Int. Cl.
H04Q 7/20 (2006.01)
H04Q 7/00 (2006.01)
(52) U.S. Cl. .................. 455/418; 455/450; 455/452.1; 455/452.2; 370/329; 370/338; 370/468
(58) Field of Classification Search ................ 455/444, 455/445, 436, 450, 453, 451, 452.2; 370/345, 370/328, 337, 395.21, 436, 329, 338, 468
See application file for complete search history.

(56) References Cited

U.S. PATENT DOCUMENTS 6,701,149 B1 3/2004 Sen et al.

6,993,002 B1* 1/2006 Pan et al. .................... 370/335
2001/0009857 A1 7/2001 Vanttinen
2003/0026227 A1 2/2003 Zeira et al.
2004/0004949 A1* 1/2004 Cayla et al. ................. 370/338

FOREIGN PATENT DOCUMENTS

DE 198 24 140 12/1999

OTHER PUBLICATIONS

3rd Generation Partnership Project; Technical Specification Group Radio Access Network; Spreading and Modulation (TDD) (Release 4), 3GPP TS 25.223 v4.4.0; Mar. 2002.
"TDD Timing Advance System Level Design White Paper," Release 2.0, Apr. 2002.
"UTRA-TDD Radio Resource Management System Level Design White Paper" Revision 3.0, May 2002.
UTRAN Synchronization (Formally Node B Synchronization) System Level Design White Paper; Release 1.0; Oct. 2002.

(Continued)

Primary Examiner—George Eng
Assistant Examiner—Nam Huynh
(74) Attorney, Agent, or Firm—Volpe and Koenig, P.C.

(57) ABSTRACT

A method and system is disclosed for optimizing resource management in wireless communication systems wherein resources in neighboring and serving cells may be reassigned so that fragmentation may be reduced in serving cells. Resources in wireless communication systems are preferably managed to minimize fragmentation and where fragmentation can not be reduced based on current resource allocations, resources may be reassigned to allow fragmentation to be reduced.

16 Claims, 3 Drawing Sheets

OTHER PUBLICATIONS

3GPP TS 25.223 v4.4.0; 3rd Generation Partnership Project; Technical Specification Group Radio Access Network; Spreading and modulation (TDD) (Release 4), Mar. 2002.

TDD Timing Advance System Level Design White Paper, Release 2.0, Apr. 2002.

UTRA-TDD Radio Resource Management System Level Design White Paper, Revision 3.0, May 2002.

UTRAN Synchronization (formerly Node B Synchronization) System Level Design White Paper, Release 1.0; Oct. 2002.

3rd Generation Partnership Project; Technical Specification Group Radio Access Network; Spreading and Modulation (TDD) (Release 4), 3GPP TS 25.223 v4.4.0; Mar. 2002.

"TDD Timing Advance System Level Design White Paper," Release 2.0, Apr. 2002.

"UTRA-TDD Radio Resource Management System Level Design White Paper," Revision 3.0, May 2002.

* cited by examiner

| ⊟ | INTERFERENCE AT TS (X) |
| ⊟ | TOTAL TX POWER AT TS (X) |
| ⊟ | AVAILABLE RESOURCES AT TS (X) |

US 7,146,162 B2

METHOD AND SYSTEM FOR MANAGING RESOURCES IN WIRELESS COMMUNICATION SYSTEMS

CROSS REFERENCE TO RELATED APPLICATION(S)

This application claims priority from U.S. provisional application No. 60/457,821 filed on Mar. 25, 2003, which is incorporated by reference as if fully set forth.

FIELD OF INVENTION

The present invention relates to wireless communication systems. More particularly, the present invention relates to reducing interference and power consumption in wireless communication systems.

BACKGROUND

Wireless communication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless communication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs and access points, is to provide a wireless connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the Internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services switching center also receives and administers connection requests from subscribers to external networks.

The RNCs generally control internal functions of the UTRAN. The RNCs also provide intermediary services for communications having a local component via a Uu interface connection with a Node B and an external service component via a connection between the CN and an external system, for example overseas calls made from a cell phone in a domestic UMTS.

Typically an RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In communication systems such as Third Generation Partnership Project (3GPP) Time Division Duplex (TDD) and Frequency Division Duplex (FDD) systems, multiple shared and dedicated channels of variable rate data are combined for transmission. Background specification data for such systems are publicly available and continue to be developed.

When users are assigned timeslots in wireless communication systems utilizing TDD technology, it is often necessary to assign them to more than one timeslot due to the conditions of the timeslots. That is, users are typically assigned to timeslots (i.e. assigned resources) depending on the amount of transmission power and available resources in the user's serving cell as well as the amount of interference being received by the serving cell from its neighboring cell(s), and how that interference is distributed across the timeslots. For example, referring to FIG. 2, the level of interference in each timeslot (TS) varies as does the amount of total transmission power and the amount of available resources. Two goals in managing resources in wireless communications systems are to lower interference and to lower fragmentation. Currently known resource management techniques, however, do not take into account or try to address interference from neighboring cells when managing resources.

Accordingly, it is desirable to provide a method and system wherein resources are managed without the limitations of the prior art.

SUMMARY

The present invention is a method and system for optimizing resource management in wireless communication systems wherein resources in neighboring and serving cells may be reassigned so that fragmentation may be reduced in serving cells. Resources in wireless communication systems are preferably managed to minimize fragmentation and where fragmentation can not be reduced based on current resource allocations, resources may be reassigned to allow fragmentation to be reduced.

BRIEF DESCRIPTION OF THE DRAWING(S)

DETAILED DESCRIPTION OF THE PREFERRED EMBODIMENT(S)

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Figure 1:
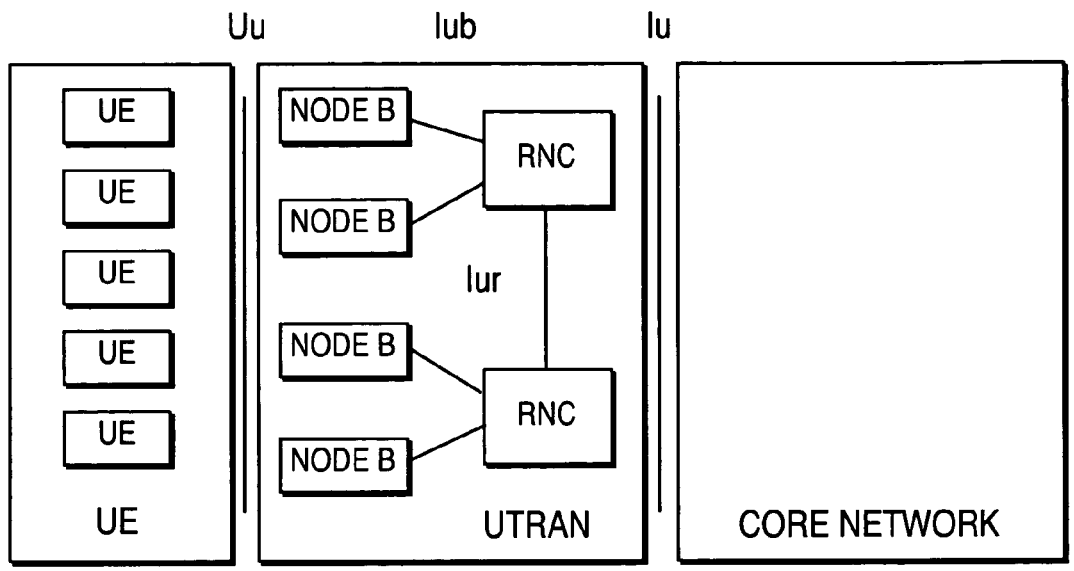
FIG. 1 is a diagram of a typical wireless communication system.
Figure 2:
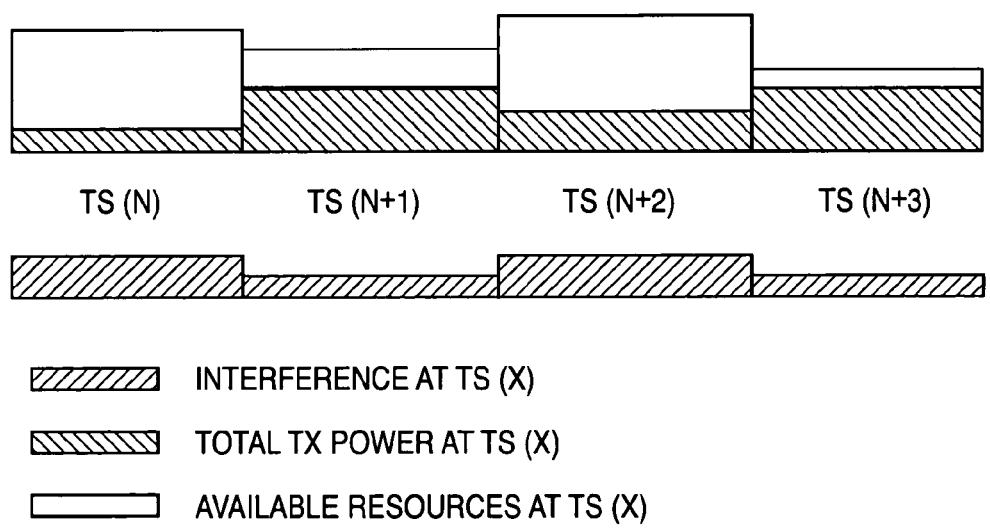
FIG. 2 is a diagram of a plurality of timeslots having varying conditions with respect to interference, transmission power, and available resources.
Figure 3:
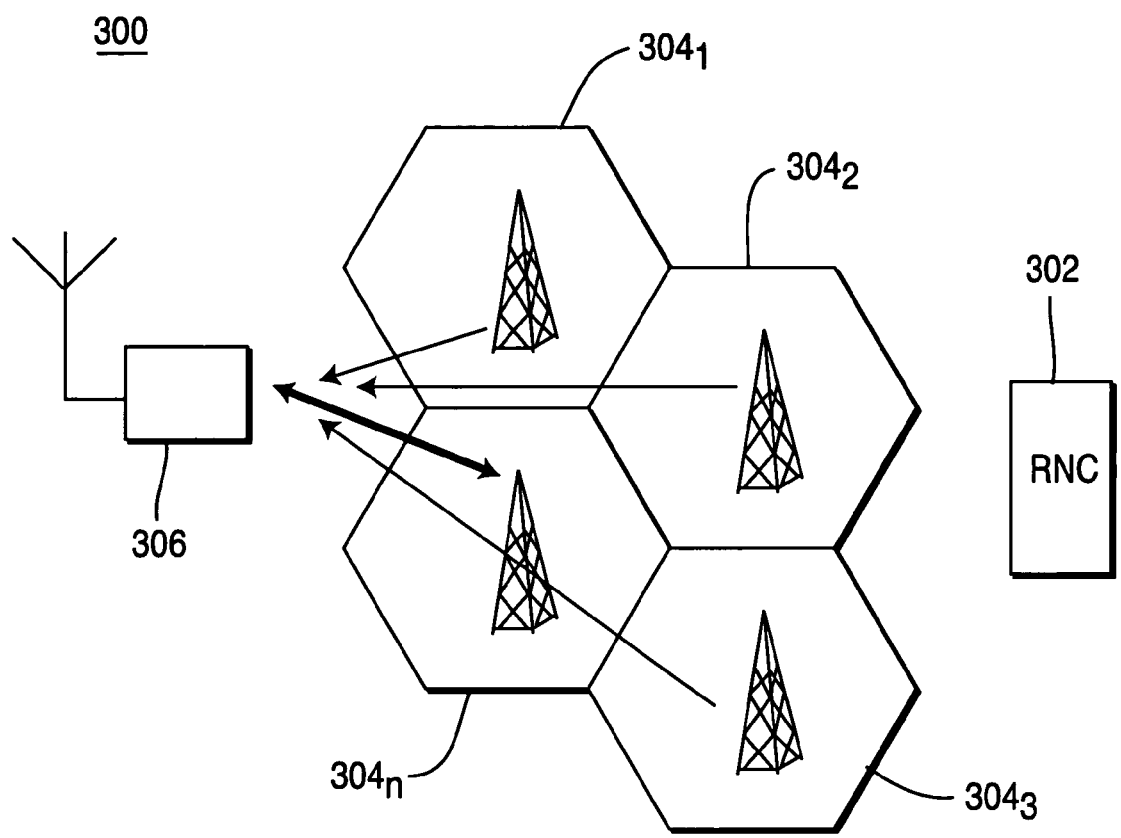
FIG. 3 is a wireless communication system for managing resources in accordance with a preferred embodiment of the present invention.

Referring initially to FIG. 3, a wireless communication system 300 in accordance with the present invention is shown. The wireless communication system 300 includes at least one radio network controller (RNC) 302, a plurality of base stations $304_1$–$304_n$, and at least one WTRU 306. It is noted that the present invention may be implemented in any type of wireless communication system utilizing TDD technology. For example, where the present invention is implemented in a wireless local area network (WLAN) type system, the base stations are, of course, access points and the RNC a local area network (LAN).

A WTRU 306 communicating with base station $304_n$ (i.e. the serving cell) will experience interference from neighboring base stations $304_1$, $304_2$, and $304_3$ (i.e. the neighboring cells). It is noted that the terms base station and cell are used interchangeably herein. The RNC 302 of the present invention present invention manages resources to favor less fragmentation. Further, where fragmentation can not be reduced based on current resource allocations, adjustments may be made to the current resource allocations in neighboring and serving cells.

For example, where WTRU 306 is communicating with base station $304_n$, the RNC 302 will periodically evaluate the allocation of resources so that the allocation is optimized. When evaluating the current allocation of resources at base station $304_n$, the RNC 302 will first determine whether it is possible to lower the number of timeslots WTRU 306 is currently required to listen to (i.e. the WTRU's 306 degree of fragmentation) while operating in cell $304_n$. The RNC 302 typically determines whether the degree of fragmentation may be reduced by evaluating whether the amount of interference in each timeslot is low enough such that the number of timeslots allocated to a particular WTRU may be reduced without causing the interference in any timeslot to exceed a predetermined maximum interference level. If it is possible to reduce the number of timeslots that the WTRU 306 has to listen to while operating in cell $304_n$, the RNC 302 will not make any further adjustments with respect to any neighboring cells $302_1$, $304_2$, and $304_3$ or the serving cell $304_n$. If it is not possible to reduce the number of timeslots, the RNC 302 will evaluate the current resource allocation at base stations $302_1$, $304_2$, and $304_3$ to determine whether the current resource allocation may be adjusted in order to reduce the amount of interference that is imparted on WTRU 306 from base stations $302_1$, $304_2$, and $304_3$.

In general, the RNC 302 will know the neighboring cells for each WTRU 306 operating within one of the cells under the control of RNC 302. The RNC 302 can therefore adjust the resource allocation within the neighboring cells. For example, assume WTRU 306 is receiving a high level of interference, the RNC 302 will evaluate the transmission power at each timeslot for all neighboring cells $302_1$, $304_2$, and $304_3$. The RNC 302 can then reassign users in timeslots having a transmission power that is above a predetermined threshold thereby lowering the amount of interference experienced by WTRU 306 while it is operating within cell $304_n$. The lower amount of interference experienced by WTRU 306 may enable the number of timeslots allocated to WTRU 306 to be reduced.

If there are no timeslots in any of the neighboring cells $304_1$, $304_2$, and $304_3$ having a transmission power that is above the predetermined value or there is otherwise no adjustments that can be made in any of the neighboring cells, the RNC 302 will evaluate the distribution of interference within the WTRU's 306 serving cell $304_n$. That is, the RNC 302 will evaluate the interference level in each timeslot with respect to cell $304_n$. If there are any timeslots having an interference above a predetermined level, users will be moved from those timeslots and placed in timeslots having an interference value below the predetermined level. Another embodiment of the invention is to wait a predetermined amount of time before reallocating interference in a serving cell to see if system conditions have changed such that fragmentation may be reduced in the serving cell or interference in the serving cell $304_n$ may be reduced by reassigning resources in the neighboring cells $304_1$, $304_2$, and $304_3$.

Figure 4:
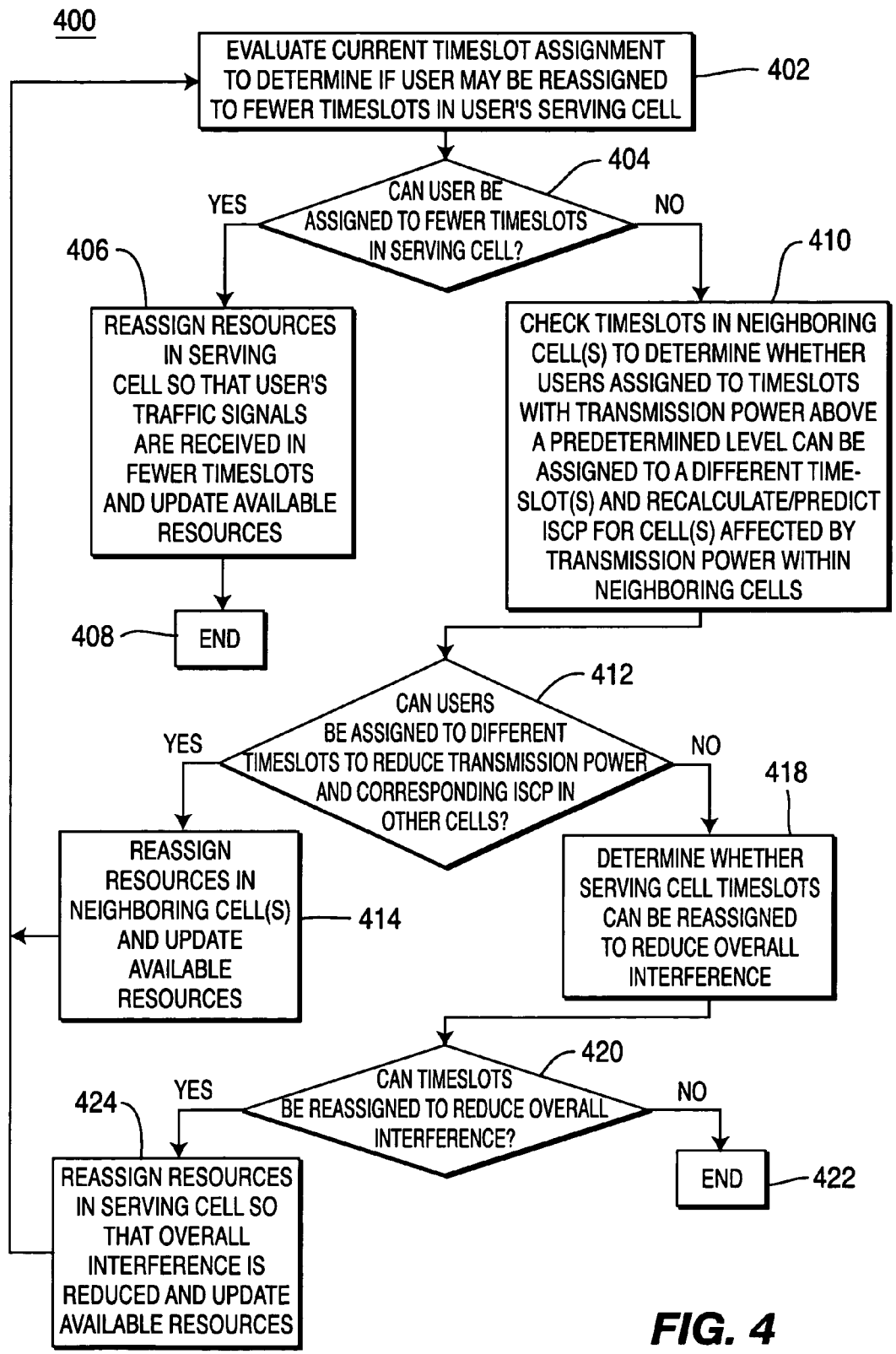
FIG. 4 is a method for managing resources in wireless communication systems in accordance with a preferred embodiment of the present invention.

Referring now to FIG. 4, there is shown a method 400 for managing resources in wireless communication systems in accordance with a preferred embodiment of the present invention. For simplicity, the method 400 is described with respect to a single user. The method begins in step 402 with evaluating the current timeslot assignment of a user's serving cell to determine (in step 404) whether the user may be reassigned to fewer timeslots in the user's serving cell.

The evaluation and determination of whether a user can be reassigned to less timeslots is typically performed based on the amount of interference in each timeslot in which the user is currently assigned. For example, assume a user is assigned to 4 timeslots wherein there is approximately 5 dB of interference in each timeslot and the user himself contributes 3 dB to each timeslot he is assigned to. Further assume that the maximum interference level per timeslot for the user's serving cell is 10 dB. In this case, the number of timeslots may be reduced without violating the maximum interference level. That is, the user may be assigned to three timeslots wherein the interference in each of those timeslots becomes 8 dB, which is still below the maximum interference level per timeslot.

If a user can be assigned to fewer timeslots, the method 400 proceeds to step 406. In step 406, the resources in the user's serving cell are reassigned so that the user's traffic signals are received in fewer timeslots. Of course, once a user is reassigned, the available resources are updated accordingly. This is the optimal situation because interference is satisfactory and the number of timeslots have been reduced thereby resulting in power savings on the part of the user. Therefore, where it is possible to assign a user to fewer timeslots, resources are reassigned in step 406 as described above and the method 400 ends in step 408 and may be restarted as desired.

If it is not possible to reassign a user to fewer timeslots, the method 400 proceeds from step 404 to step 410. It is noted that where it is not possible to reduce the number of timeslots, it is typically a result of interference levels being too high in the timeslots of the serving cell. Therefore, in such situations, method 400, generally speaking, seeks to reduce the interference in timeslots of the user's serving cell by first looking to see if any adjustments may be made in any of the neighboring cells and then looking to see if any adjustments may be made in the serving cell itself.

More specifically, in step 410, neighboring cells are evaluated to determine (step 412) whether users assigned to timeslots with a transmission power above a predetermined level can be assigned to a different timeslot(s). This is a process known to those skilled in the art wherein users contributing high levels of transmission power are preferably placed in timeslots having the least amount of interference. This approach seeks to avoid having interference in any one timeslot exceed the maximum interference level because such timeslots are the ones that typically contribute the most interference to cells affected by the transmission power of the neighboring cells. It is noted that as part of step 410, it is preferable to recalculate/predict the interference for cells affected by the transmission power within the neighboring cells.

If users in neighboring cells can be assigned to different timeslots to reduce the transmission power in the timeslots of the neighboring cells and the corresponding interference experienced by other cells, the method 400 proceeds from step 412 to step 414. In step 414, the resources in the neighboring cells are reassigned and the available resources in the neighboring cells are updated. From step 414, the method 400 preferably returns to step 402 to determine, based on the adjustments made in the neighboring cells, whether the number of timeslots the user is assigned to in its serving cell may be reduced.

If it is not possible make any adjustments in any of the neighboring cells, the method 400 proceeds from step 412 to step 418. In step 418, it is determined whether the timeslots of the user's serving cell may be reassigned to reduce the overall interference. As mentioned above, similar to any adjustments made in any neighboring cells, step 418 is performed to determine whether it is possible to reassign timeslots to reduce overall interference in the serving cell in order to allow the timeslots assigned to a user to be reduced. Therefore, it is important to note that steps 402 and 404 are concerned with reducing the number of timeslots to which a user is assigned whereas steps 418 and 420 are concerned with whether it is possible to reassign any user in the serving cell, not to less timeslots, but to different timeslots. That is, the analysis in steps 418 and 420 is similar to that performed in steps 410 and 412 wherein it is preferable for users with the highest transmission power to be in timeslots with the lowest interference.

If the timeslots in the serving cell can not be reassigned to reduce overall interference, the method 400 proceeds from step 420 to step 422 where the method 400 ends and may be restarted as desired. If the timeslots can be reassigned to reduce overall interference, the method 400 proceeds from step 420 to step 424. In step 424, the resources in the serving cell are reassigned and the available resources are updated. Then, the method 400 returns to step 402 to determine, based on the adjustments made in the serving cell, whether the number of timeslots the user is assigned to may be reduced.

It is important to note that the present invention may be implemented in any type of wireless communication system employing any type of time division duplex (TDD) technology, as desired. By way of example, the present invention may be implemented in UMTS-TDD, TDSCDMA, or any other type of wireless communication system including WLAN type systems utilizing TDD technology. Further, while the present invention has been described in terms of various embodiments, other variations, which are within the scope of the invention as outlined in the claim below will be apparent to those skilled in the art.

What is claimed is:

1. A wireless communication system comprising;
    at least one wireless transmit/receive unit (WTRU);
    at least one base station; and
    at least one radio network controller (RNC), said RNC configured to evaluate resources in said WTRU's serving cell to determine whether the number of timeslots assigned to said WTRU may be reduced and further configured to reduce the number of timeslots where said determination is positive;
    said RNC further configured to reassign resources in neighboring cells to reduce the amount of interference imparted on said serving cell by said neighboring cells and to reevaluate reduction of timeslots in said serving cell where resources in said neighboring cells have been reassigned and the number of timeslots were not previously reduced; and
    said RNC further configured to reassign resources in said serving cells to reduce the amount of interference in said serving cell and to reevaluate reduction of timeslots in said serving cell where resources in said serving cell have been reassigned and the number of timeslots were not previously reduced.

2. The system of claim 1 wherein the RNC, after evaluating resources in said neighboring cells, waits a predetermined amount of time, checks whether conditions have changed, and checks again whether timeslots assigned to said WTRU in said WTRU's serving cell may be reduced.

3. The system of claim 1 wherein the at least one RNC is a local area network and the at least one base station is an access point.

4. A wireless communication system wherein an at least one wireless transmit/receive unit (WTRU) is operating within a serving cell wherein said serving cell is receiving interference from neighboring cells, the system comprising:
   at least one radio network controller (RNC), said RNC configured to evaluate resources in said WTRU's serving cell to determine whether the number of timeslots assigned to said WTRU may be reduced and further configured to reduce the number of timeslots where said determination is positive;
   said RNC further configured to reassign resources in neighboring cells to reduce the amount of interference imparted on said serving cell by said neighboring cells and to reevaluate reduction of timeslots in said serving cell where resources in said neighboring cells have been reassigned and the number of timeslots were not previously reduced; and
   said RNC further configured to reassign resources in said serving cells to reduce the amount of interference in said serving cell and to reevaluate reduction of timeslots in said serving cell where resources in said serving cell have been reassigned and the number of timeslots were not previously reduced.

5. The system of claim 4 wherein the RNC, after evaluating resources in said neighboring cells, waits a predetermined amount of time, checks whether conditions have changed, and checks again whether timeslots assigned to said WTRU in said WTRU's serving cell may be reduced.

6. The system of claim 4 wherein the at least one RNC is a local area network.

7. A method for optimizing resource management in wireless communication systems, the method comprising the steps of:
   performing a first evaluation of resources in a serving cell of a wireless transmit/receive unit (WTRU);
   performing a first determination based on said first evaluation whether the number of timeslots assigned to said WTRU may be reduced;
   reducing the number of timeslots where said first determination is positive;
   performing a second evaluation of resource allocation in at least one neighboring cell where said first determination is negative;
   performing a second determination based on said second evaluation whether resources in the at least one neighboring cell may be reassigned to reduce interference in said serving cell;
   reassigning resources in the at least one neighboring cell and repeating said first evaluation and first determination where said second determination is positive;
   performing a third evaluation of resource allocation in said serving cell where said second determination is negative;
   performing a third determination based on said third evaluation whether resources in said serving cell may be reassigned to reduce interference in said serving cell; and
   reassigning resources in said serving cell and repeating said first evaluation and first determination where said third determination is positive.

8. The method of claim 7 wherein a predetermined delay is provided before performing the third evaluation to provide an opportunity for conditions in the serving cell to change and performing said first evaluation and first determination a predetermined number of times prior to returning to the third evaluation.

9. The method of claim 7 wherein resource allocations are updated after any resources are reassigned to lower interference in said serving cell.

10. The method of claim 7 wherein the method is implemented in a wireless communication system including at least one access point and a local area network.

11. The method of claim 7 wherein the method is implemented in a wireless communication system including at least one base station and at least one radio network controller.

12. A method for optimizing resource management in wireless communication systems, the method comprising the steps of:
   reducing the number of timeslots assigned to a wireless transmit/receive unit (WTRU) where reduction of timeslots does not result in a predetermined maximum level of interference being exceeded in any timeslot;
   reassigning resources in neighboring cells to lower interference in the serving cell where reduction of timeslots causes the predetermined maximum level to be exceeded in any timeslot and repeating the step of reducing the number of timeslots assigned to the WTRU; and
   reassigning resources in the serving cell to lower interference in the serving cell where reduction of timeslots still causes the predetermined maximum to be exceeded despite reassigning resources in the neighboring cells and again repeating the step of reducing the number of timeslots assigned to the WTRU.

13. The method of claim 12 wherein a predetermined delay is provided before reassigning resources in the serving cell to provide an opportunity for conditions in the serving cell to change and repeating the step of reducing the number of timeslots assigned to the WTRU a predetermined number of times prior to attempting to reassign resources in the serving cell.

14. The method of claim 12 wherein resource allocations are updated after any resources are reassigned to lower interference in said serving cell.

15. The method of claim 12 wherein the method is implemented in a wireless communication system including at least one access point and a local area network.

16. The method of claim 12 wherein the method is implemented in a wireless communication system including at least one base station and at least one radio network controller.

* * * * *

UNITED STATES PATENT AND TRADEMARK OFFICE
CERTIFICATE OF CORRECTION

PATENT NO. : 7,146,162 B2  Page 1 of 1
APPLICATION NO. : 10/807969
DATED : December 5, 2006
INVENTOR(S) : Tsai et al.

It is certified that error appears in the above-identified patent and that said Letters Patent is hereby corrected as shown below:

ON THE FACE PAGE

Remove all other publications (7 of them) appearing on Page 2 because the references have already been cited on Page 1.

IN THE SPECIFICATION

At column 2, line 25, after the word "serving", delete "networks" and insert therefor --network's--.

At column 3, lines 65 & 66, after the words "of the", delete the first instance of "present invention".

At column 4, line 22, before "$304_2$, and $304_3$", delete "$302_1$" and insert therefor --$304_1$--.

At column 4, line 25, before "$304_2$, and $304_3$", delete "$302_1$" and insert therefor --$304_1$--.

At column 4, line 29, before "$304_2$, and $304_3$", delete "$302_1$" and insert therefor --$304_1$--.

At column 4, line 36, before "$304_2$,", delete "$302_1$" and insert therefor --$304_1$--.

At column 5, line 65, after the word "possible", insert --to--.

At column 6, line 36, before the word "below", delete "claim" and insert therefor --claims--.

Signed and Sealed this

Eighteenth Day of September, 2007

JON W. DUDAS
*Director of the United States Patent and Trademark Office*